United States Patent [19]

Andoh et al.

[11] 4,382,638
[45] May 10, 1983

[54] SEALING STRUCTURE OF SPINDLE DEVICE

[75] Inventors: Shigenori Andoh; Toshiharu Kogure, both of Narashino, Japan

[73] Assignee: Seiko Seiki Kabushiki Kaisha, Japan

[21] Appl. No.: 269,621

[22] Filed: Jun. 2, 1981

[51] Int. Cl.³ .............................................. F16C 33/66
[52] U.S. Cl. ................................... 308/187; 277/134; 277/135; 308/187.1
[58] Field of Search ................... 308/187.1, 187, 36.3, 308/189 R, 101, 122, 114, 187.2; 277/134, 135

[56] References Cited

U.S. PATENT DOCUMENTS

| | | | |
|---|---|---|---|
| 4,084,825 | 4/1978 | Ludwig | 277/134 |
| 4,090,743 | 5/1978 | Suzuki | 308/122 |
| 4,101,180 | 7/1978 | Anderson | 308/101 |
| 4,236,721 | 12/1980 | Pennock | 277/135 |
| 4,269,459 | 5/1981 | Peck | 308/189 R |
| 4,339,160 | 7/1982 | McHugh | 308/36.3 |

Primary Examiner—Lenard A. Footland
Attorney, Agent, or Firm—Robert E. Burns; Emmanuel J. Lobato; Bruce L. Adams

[57] ABSTRACT

A spindle device comprises a spindle housing having rotatably mounted therein a hollow tubular spindle and a rotary motor for rotationally driving the spindle. One end of the spindle projects outwardly of the housing, and the other end of the spindle is disposed within the housing. A lubricating oil system flows oil through the hollow spindle to the work tool and the system includes an oil conduit which extends a predetermined extent into the interior of the hollow spindle at the spindle other end with a small clearance between the conduit and the spindle. A helical recess is formed on the outer periphery of the oil conduit, or the inner periphery of the spindle, or both, in the region where the oil conduit extends into the spindle so that during high speed rotation of the spindle, a helical airflow is created in the region where the lubricating oil enters the spindle to prevent the outflow of oil from the spindle other end.

4 Claims, 2 Drawing Figures

SEALING STRUCTURE OF SPINDLE DEVICE

BACKGROUND OF THE INVENTION

The present invention relates to a spindle device having a passage for lubricating oil (a cutting oil, grinding oil, etc.) inside a spindle axis. More particularly, this invention relates to a sealing structure of the spindle device which improves a stability of the spindle axis in case the spindle rotates at a high speed and which restrains permeation of the lubricating oil into a bearing and the like inside a housing, by storing a rear end portion of the spindle in the housing.

Conventionally, a spindle device having a grinding oil passage inside a spindle for supplying the grinding oil directly to a grinding portion via the spindle is used in order to grind an inner peripheral face of an aperture having substantially the same diameter as that of a grind stone by means of a grinding machine, since it is difficult to supply a cutting oil of sufficient quantity into a clearance between the grind stone and the inner periphery of the aperture from the outside. In such spindle devices, a bearing portion, motor portion and the like of the spindle device have to be stored inside a sealed housing so that the grinding oil including metal powders scattered from the grinding portion do not permeate into them. Moreover, the elongation of the length of the spindle is not preferable in order to rotate the spindle stably at a high speed. Accordingly, conventional spindle devices of this type store a rear end portion of the spindle in the housing and insert a grinding oil conduit into the housing and position the coupling portions of both the former and the latter inside the housing, in order to supply the grinding oil to the hollow spindle. However, it is difficult to seal the spindle and the grinding oil conduit completely since the former rotates at a high speed and the latter rests, so that there exists the problem that the grinding oil which leaks from the sealed portion scatters in the housing and damages the bearing portion and the motor portion.

Accordingly, it is an object of the present invention to provide a sealing structure of a spindle device which enables a spindle to rotate stably at a high speed and which effectively prevents a lubricating oil from permeating into a bearing portion and the like disposed inside the spindle housing, by positioning a rear end portion of the spindle in the housing.

Hereinafter, the present invention will be illustrated in conjunction with the preferred embodiment.

Figure 1:
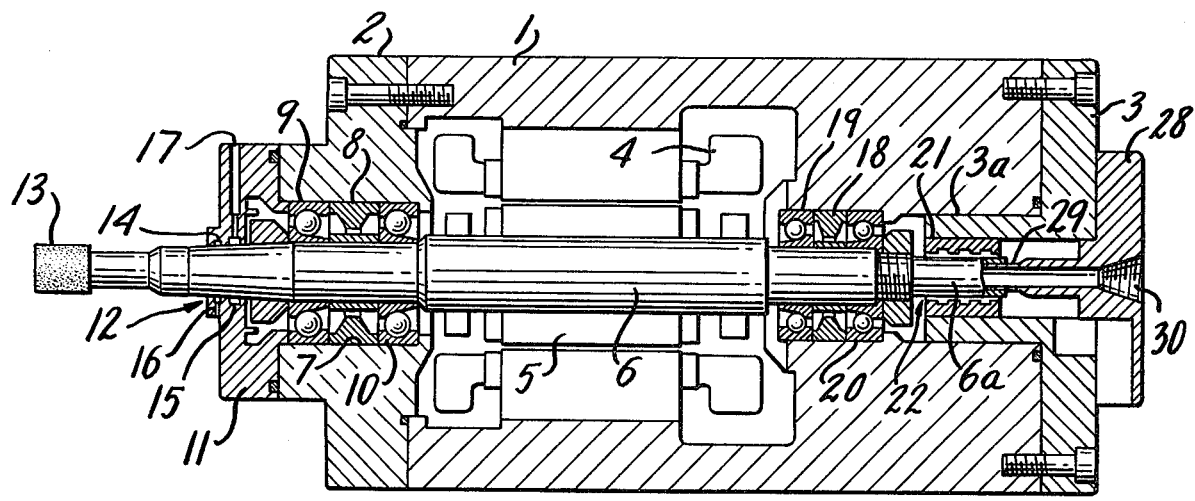
FIG. 1 is a side sectional view of a high-cycle motor spindle device having a sealing structure according to the invention.

FIG. 1 is a side sectional view of a high-cycle motor spindle device having a sealing structure according to the present invention. In the drawing, reference numeral 1 denotes a cylindrical spindle housing body having a front cover 2 attached to a front opening of the spindle housing body 1 and a rear cover 3 attached to a rear opening of the spindle housing body 1. A spindle housing is formed by the parts 1 to 3. The spindle housing body 1 is provided with an annular stator 4 which comprises part of a high-cycle motor, and a hollow spindle 6 having a rotor 5 is rotatably set in the stator 4. A front portion of the hollow spindle 6 is rotatably supported by two ball bearings 9 and 10 parallelly set via a distance collar inside a bearing hole 7 of the front cover 2, and the front end of the hollow spindle 6 projects forward through a through-hole 12 of a front plate 11 attached to the front face of the front cover 2 to block the bearing hole 7. A work tool comprising a grind stone 13 is mounted at the front end of the hollow spindle 6 in this embodiment. Two ring-shaped recesses 14 and 15 are formed at an inner peripheral face of the through-hole 12 of the front plate 11, and air is injected into the recesses 14 and 15 by way of air passages 16 and 17 to seal a clearance between the hollow spindle 6 and the through-hole 12 so that foreign matter may not permeate into the housing.

A rear portion of the hollow spindle 6 is rotatably supported by ball bearings 19, 20 parallelly set in a bearing holder (not shown) by way of a distance collar 18.

Reference numeral 21 denotes a sealing block having a through-opening 22 in which is loosely inserted a rear end portion 6a of the hollow spindle 6. The sealing block 21 is engaged and held in a cylindrical portion 3a projected inwardly from a center opening of the rear cover 3. Ring-shaped recesses 23, 24 and 25 are formed at an inner periphery of the through-opening 22 of the sealing block 21 and communicate with an air passage 26 formed in the rear cover 3. The air passage 26 communicates with an air conduit connecting port 27 formed at a rear plate 28 attached to the center opening of the rear cover 3 to choke the same. By such a construction, the clearance between the sealing block 21 and the hollow spindle axis 6 is sealed by blowing air from the air conduit connecting port 27 and injecting the air therefrom and an permeation of the grinding oil and the like into the housing is prevented.

Figure 2:
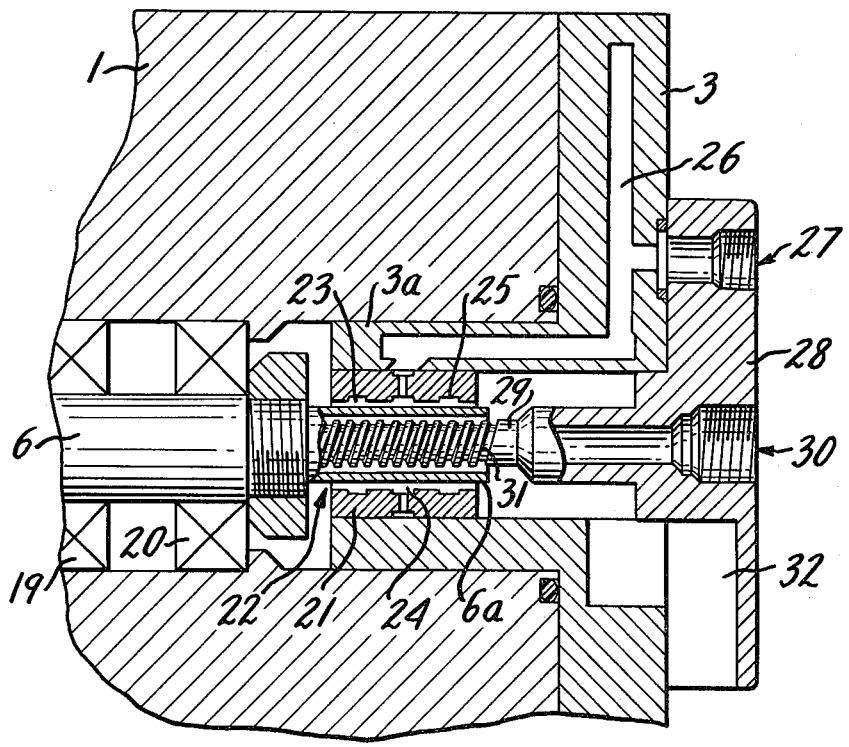
FIG. 2 is an enlarged view of an essential portion of the high-cycle motor spindle device.

Reference numeral 29 denotes a grinding oil conduit for introducing the grinding oil to the rear end portion 6a of the hollow spindle axis 6. The grinding oil conduit 29 is formed by projecting a center portion of the rear plate 28 inwardly in a tubular shape, the end portion of which is loosely inserted into the hollow spindle 6 by an appropriate length and the tip portion of which is provided with a grinding oil conduit connecting port 30. A helical or spiral recess 31 is formed around the outer periphery of the grinding oil conduit 29 which is inserted into the hollow spindle 6 as shown in FIG. 2. When the hollow spindle 6 is rotated, air is drawn in from the rear end of the spindle 6 and flows in a generally helical manner by a screw pump function and in this manner, overflow of the grinding oil between the spindle 6 and the grinding oil conduit 29 is prevented.

Reference numeral 32 denotes an exhaust passage for immediately exhausting the grinding oil, which would otherwise possibly overflow from the rear end of the hollow spindle 6 to the outside of the housing, when the hollow spindle 6 stops rotating. The high pressure air supplied to the air conduit connecting port 27 and the grinding oil supplied to the grinding oil conduit connecting port 30 are interlockingly controlled by suitable valving outside the spindle device, i.e. the grinding oil is never supplied until the air is supplied.

In this structure, the grinding oil supplied from the grinding oil conduit connecting port 30 is fed to the hollow spindle 6 by way of the grinding oil conduit 29, and finally ejected from the tip of the grind stone 13 to the grinding portion by way of the hollow spindle 6. So in the case an inner periphery of an aperture having substantially the same diameter as the grind stone is being grinded, grinding oil of the sufficient quantity is supplied to the grinding portion. Since the portion where the front end portion of the hollow spindle 6 projects through the front plate 11 is sealed by air, the grinding oil scattered from the grinding portion is effectively prevented from permeating into the housing. In a similar manner, since the clearance between the rear end portion of the hollow spindle 6 and the sealing block 21 is sealed by air, the grinding oil which overflows from the rear end of the hollow spindle 6 is effectively prevented from permeating into the housing. Further, a reverse flow of the grinding oil at the clearance between the grinding oil conduit 29 and the hollow spindle 6 is securely prevented by a screw pump function while the hollow spindle 6 is rotating. The screw pump function is obtained by the screw thread provided at the inner peripheral face of the rear end of the hollow spindle 6 which engages with the grinding oil conduit 29.

According to this embodiment, the rear end portion of the hollow spindle 6 is disposed in the housing, and the length between the bearing portion (bearings 19, 20) and the rear end of the hollow spindle 6 is minimum, whereby the stability of the hollow spindle 6 in case of high speed rotation is maintained and at the same time, the clearance between the rear end portion of the hollow spindle 6 and the grinding oil conduit 29 and the clearance between the rear end portion of the hollow spindle 6 and the inner peripheral face of the sealing block 21 are tightly sealed. Consequently, the permeation of the grinding oil into the bearings and the like inside the housing is securely prevented, and the reliability and durability of the spindle device of this type is exceedingly improved.

Means to pre-pressure the hollow spindle and to absorb the thermal expansion of the same are not shown in FIGS. 1 and 2, though it is to be noted that these are provided in the spindle device.

As clearly understood by the embodiment, in the spindle device having the sealing structure according to the present invention, the hollow spindle projects through the front wall of the housing and is supported by the bearings provided inside the housing, the lubricating oil conduit projects inwardly from the lubricating oil port provided at the rear wall of the housing and is loosely inserted into the spindle by an appropriate length, and rear end portion of the spindle is stored in the housing, and the outer periphery of the spindle and the housing are tightly sealed by way of a minute clearance. Further, air sealing mechanisms are provided at the clearances between the front wall of the housing and the hollow spindle and between the outer periphery of the rear end portion of the spindle and the housing, and the spiral recess is formed at one or both the outer periphery of the lubricating oil conduit and the inner periphery of the spindle, whereby the lubricating oil overflown from these clearances are prevented by the screw pump function. Accordingly, the stability of the hollow spindle in case of high-speed rotation is maintained and the permeation of the lubricating oil into the bearings and the like inside the housing is securely prevented, whereby the reliability and durability of the spindle device of this type is exceedingly improved.

We claim:

1. A sealing structure of a spindle device comprising: a spindle housing; a hollow spindle disposed in said housing and having a front portion projecting through a front wall of the housing and having a rear end portion disposed within said housing and being rotatably supported by bearing means provided inside said housing; a lubricating oil conduit projecting inwardly from a lubricating oil port provided at a rear wall of said housing and being loosely inserted into said spindle by an appropriate length; and sealing means for sealing the clearances between an outer periphery of said spindle and said housing including the clearance between the front end portion of the spindle and a front plate, and the clearance between the outer periphery of the spindle and the housing, said sealing means including a spiral recess provided at one or both of the outer periphery of the lubricating oil conduit and the inner periphery of the spindle, whereby an overflow of the lubricating oil from the clearances is restrained by a screw pump function caused by the spiral recess.

2. A spindle device comprising: a spindle housing; a hollow tubular spindle rotatably mounted in the housing, one end of the spindle projecting outside the housing for attachment to a work tool and the other end of the spindle being disposed within the housing; oil supply means for supplying lubricating oil into the spindle other end for flow through the hollow tubular spindle to the spindle one end; and air sealing means for flowing air into the housing to effectively seal clearances between the spindle and housing; said air sealing means including means for creating a generally helical flow of air in the region where the lubricating oil enters the hollow tubular spindle to prevent the outflow of lubricating oil from the spindle other end during rotation of the spindle.

3. A spindle device according to claim 2; wherein said means for creating a generally helical flow of air comprises means defining a helical recess within the hollow tubular spindle at the other end thereof for causing the air to flow in a helical manner.

4. A spindle device according to claim 2; wherein the oil supply means includes an oil conduit connected to the housing and extending inwardly a predetermined extent into the interior of the hollow tubular spindle at the spindle other end with a clearance between the oil conduit and the spindle; and wherein the means for creating a generally helical flow of air comprises means defining a helical recess on one or both of the outer periphery of the oil conduit and the inner periphery of the spindle in the region where the oil conduit extends into the spindle.

* * * * *